United States Patent
De Pasquale et al.

(10) Patent No.: US 9,456,437 B2
(45) Date of Patent: Sep. 27, 2016

(54) METHOD AND PORTABLE DATA APPARATUS FOR OPERATING MOBILE TERMINALS IN A CELLULAR TELECOMMUNICATIONS NETWORK

(71) Applicants: Vodafone IP Licensing Limited, Berkshire (GB); VODAFONE ESPANA, Alcobendas (ES)

(72) Inventors: Andrea De Pasquale, Alcobendas (ES); Yannick Le Pezennec, Alcobendas (ES); Francisco Javier Domínguez Romero, Alcobendas (ES)

(73) Assignees: VODAFONE IP LICENSING LIMITED, Newbury, Berkshire (GB); VODAFONE ESPANA, Alcobendas (ES)

( * ) Notice: Subject to any disclaimer, the term of this patent is extended or adjusted under 35 U.S.C. 154(b) by 0 days.

(21) Appl. No.: 14/387,257

(22) PCT Filed: Mar. 25, 2013

(86) PCT No.: PCT/EP2013/056320
§ 371 (c)(1),
(2) Date: Sep. 23, 2014

(87) PCT Pub. No.: WO2013/139999
PCT Pub. Date: Sep. 26, 2013

(65) Prior Publication Data
US 2015/0133136 A1 May 14, 2015

(30) Foreign Application Priority Data

Mar. 23, 2012 (ES) .................................. 201230443

(51) Int. Cl.
*H04W 36/14* (2009.01)
*H04W 72/02* (2009.01)
*H04W 48/18* (2009.01)
*H04W 72/04* (2009.01)
*H04W 76/02* (2009.01)
*H04W 88/06* (2009.01)

(52) U.S. Cl.
CPC ............. *H04W 72/02* (2013.01); *H04W 48/18* (2013.01); *H04W 72/0453* (2013.01); *H04W 76/02* (2013.01); *H04W 36/14* (2013.01); *H04W 76/022* (2013.01); *H04W 88/06* (2013.01)

(58) Field of Classification Search
CPC . H04W 24/00; H04W 72/082; H04W 16/10; H04W 72/04; H04W 28/04; H04W 72/02; H04W 36/14; H04W 48/18; H04W 72/0453; H04W 76/022; H04W 76/02; H04W 88/06
See application file for complete search history.

(56) References Cited

U.S. PATENT DOCUMENTS

| | | | |
|---|---|---|---|
| 2011/0040888 A1* | 2/2011 | Krishnaswamy ... | H04L 63/0884 709/231 |
| 2013/0064176 A1* | 3/2013 | Hsu ........................ | H04W 4/02 370/328 |

* cited by examiner

*Primary Examiner* — Ted Wang
(74) *Attorney, Agent, or Firm* — B. Aaron Schulman, Esq.; Stites & Harbison, PLLC.

(57) ABSTRACT

The invention relates to both a method and a network entity in a cellular communication network serving mobile terminals or communication devices, offering control over terminals in order to ensure that the best possible data connection is available to the user at all times whatever the coverage scenario and technology the terminals are operating on.

16 Claims, 2 Drawing Sheets

1st     2nd     3rd     4th     5th     6th     7th

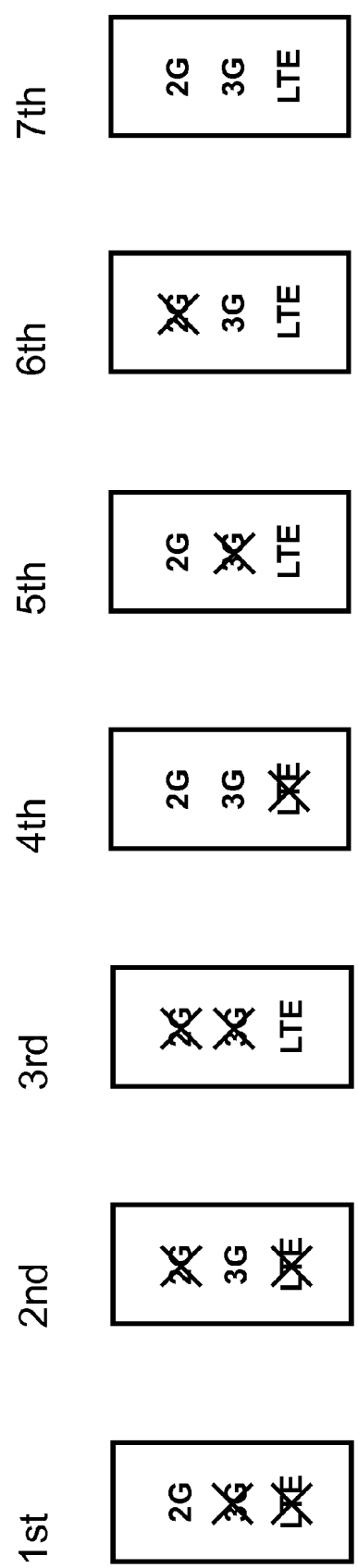

METHOD AND PORTABLE DATA APPARATUS FOR OPERATING MOBILE TERMINALS IN A CELLULAR TELECOMMUNICATIONS NETWORK

FIELD OF THE INVENTION

The invention relates to the management of data connections in cellular telecommunications networks that offer a plurality of radio access technologies. In particular, the invention relates to the management of a plurality of coupled mobile terminals in order to optimise data transfer by governing the selection of network connections enabled at each of the mobile terminals.

BACKGROUND

In the current deployed cellular telecommunications networks, the usage of Packet Switched (PS) traffic for Packet Services has boomed. A similar trend is apparent in the take up of different mobile client applications ("apps") and the usage of cellular data connectivity as a mobile alternative to fixed line broadband network access, such as Asymmetric Digital Subscriber Line (ADSL)—often referred to a "mobile broadband".

The Radio Access technologies adopted in cellular telecommunications networks are conveniently discussed in terms of "generations". Second generation (2G) technologies include GSM, GPRS, D-AMPS and CDPD, for example: while third generation (3G) technologies include UMTS, CDMA2000 and WD-CDMA for example. In certain "Beyond 3G" scenarios sometimes referred to as "4G", Long Term Evolution (LTE) technology is introduced. The "earlier" generations have not in general fallen into disuse and it is typical that LTE technology is implemented in cellular network architectures that already provide access using existing 3G (UMTS) and 2G (GSM-GPRS) technologies (with substantially overlapping geographical coverage).

At the moment, when each of these three radio technologies (GPRS, UMTS, LTE) is available for users, every User Equipment (UE) would, by default, camp on the technology assigned the highest priority level by the mobile network operator, i.e. LTE over UMTS over GPRS. A UE is only typically redirected to another technology where there is a high likelihood of losing and/or coverage or capacity. This criterion for redirecting a user to a radio technology is not optimum for most of the applications, as the requirements (e.g., latency sensitivity) for each application is different.

Subscribers who wish to access mobile packet services from a portable computing device, such as a laptop PC or a netbook, have a number of options: the portable device may have a suitable wireless wide area access network (WWAN) module or embedded cellular radio access modem; he may choose to couple his device physically or via a short range wireless technology (such as Bluetooth® or Zigbee®) to a cellular communications device; or he may use a dedicated external cellular modem, which couples to the portable device via an existing interface such as PCMCIA or USB. It is known that such access devices may be adapted to provide access to more than one different radio access networks—while being active on only one access network at any one time: thus an LTE-enabled USB modem dongle may also have 2G and/or 3G capabilities.

Subscribers may wish to avail themselves of more than one of these packet service access options simultaneously. In one typical arrangement, the user obtains two commercially available dedicated cellular modem devices, typically USB dongles, and couples both modems to his computing device.

A mechanism is known in the art that allows such a subscriber to aggregate the data capacity of two or more packet service access devices. In essence, this mechanism makes it possible to emulate, for example, a connection aggregating 3G and LTE data connections. Clearly, building a hybrid device that combines two or more packet service access devices from scratch would require considerable development efforts (including standardisation in 3GPP). To aggregate the 3G and LTE data connections of the example, the pragmatic approach is thus to use one commercial cellular modem device (henceforth referred to simply as a "terminal") that is 3G capable and one commercial terminal that is LTE capable.

This pragmatic approach does however mean that the two terminals are operating independently just as they would for two different subscribers. In order to manage a hybrid connection using these two commercially available terminals, it is would be desirable to have some level of control over both terminals in order to ensure that the best possible data connection is available to the user at all times whatever the coverage scenario and technology the devices are operating on.

SUMMARY OF THE INVENTION

The invention addresses the issue of how two terminals can be used by the same subscriber (or more accurately by a user client application with which the subscriber can interface) to work together (i.e. aggregating the data connections offered by the two terminals) depending on the Mobile Network Technology coverage available to the respective terminals. Thus the invention facilitates the management of the operation of the hybrid connection at the portable device coupled to at least two mobile terminals.

In accordance with one aspect of the present invention there is provided a method in a portable data apparatus for managing data connections in a telecommunication network. The apparatus is in communicative connection with at least a first and a second mobile terminal, each mobile terminal being operable to establish a data connection in said telecommunication network over a plurality of types of radio access technologies. The method comprising: determining which type of radio access technology at least one of the terminals is camped upon; controlling connections of each one of the terminals in respective cells of respective Radio Access Technology Types, RATs; and, setting a given terminal as operative for establishing a data connection when said terminal is determined to be camped in a particular RAT.

This method provides users with the best possible data connection available whatever the coverage scenario and technology the devices are operating on.

Both terminals may be camped on a cell of the same RAT or of different RATs.

In some cases, the method can be implemented when the first cell belongs to a first network type and the second cell to the same or different network type wherein the first network type offers a faster speed connection than the second network type; or vice versa.

When operating in a network supporting 2G, 3G and LTE technologies, there may be different cases of coverage scenarios. The two mobile terminals in one portable device camp on a default technology according to existing criteria of cell selection and reselection as defined in the relevant 2G, 3G, and LTE 3GPP specifications.

For each of these cases of coverage, the invention allows for one or more of the two (or more) terminals to be selected for establishing a data connection at call setup (i.e. while in idle mode) and during an active call (when reselection is needed as the coverage scenario changes).

Furthermore, the invention relates to the selection of a first terminal that will establish the first connection with the first network type, although this selection may depend on the types of network access technology, hence:

When the first and second network types are the same; the terminal with best coverage level will act as the first terminal to establish the first connection with the first network type.

When the network types are different:
the terminal with higher TOS (Terms of Service) operator configurable access technology—in case of 3G, LTE scenario, and/or
the terminal with higher priority RAT (priority typically follows the hierarchy: LTE>3G>2G), will act as the first terminal to establish the first connection with the first network type.

The invention further allows two terminals to be operated together to provide a hybrid connection when coverage and terminal capabilities coincide to facilitate such a connection and limits data connections to a selected single terminal in the other scenarios Thus in a further aspect of the invention the method may comprise establishing a dual connection by means of both terminals. Further the method may comprise aggregating the connections to provide an enhanced data connection.

Optionally, the portable data apparatus may have access to a Radio Network Controller, RNC, of the telecommunication network. In this embodiment the method may comprise: accessing the RNC to force terminal connection despite coverage.

Further, the method may comprise, when both terminals are determined to be camped upon a 2G cell, setting a given terminal to search for a cell of another RAT. In this embodiment, the another RAT may preferably be 3G or LTE.

Further, the method may comprise, when both terminals are determined to be camped upon a 3G cell, setting at least one of the terminals to search for a cell of another RAT. In this embodiment, the another RAT may preferably be LTE.

Additionally, the above method may comprise, when both terminals are determined to be camped upon a cell of the same RAT and when both terminal is determined to be camped in a preferred RAT: setting the first terminal as operative for establishing a data connection; determining different available frequency bands of cells of the RAT by instructing the second terminal to looking at neighbouring cells; and, instructing the second terminal to camp in a cell of the same RAT using an available frequency band different from the frequency band used by the cell in which the first terminal is camped according to frequency band priority defined by the operator. In this embodiment the RAT may optionally be 3G and LTE may be unavailable. The method may further comprise switching the second terminal to a 2G cell and establishing a PDP context if no available frequency band is found.

Additionally, the method may also comprise, when both terminals are determined to be camped upon a cell of the same RAT, setting only the terminal with best coverage level as operative for establishing a data connection when said terminal is determined to be camped in a preferred RAT.

Additionally, the method may also comprise, when both terminals are determined to be camped upon a cell of a different RAT, setting only the terminal with higher priority RAT as operative for establishing a data connection when said terminal is determined to be camped in a preferred RAT.

Additionally, the method may also comprise, when both terminals are determined to be camped upon a cell of a different RAT, setting only the terminal with higher TOS operator configurable access technology priority level as operative for establishing a data connection when said terminal is determined to be camped in a preferred RAT.

In accordance with another aspect of the invention, there may be provided a portable data apparatus for managing data connections in a telecommunication network, the apparatus being in communicative connection with at least a first and a second mobile terminal, each mobile terminal being operable to establish a data connection in said telecommunication network over a plurality of types of radio access technologies; wherein the apparatus comprises a processor adapted to carry out the method steps of any of the above aspects of the invention.

The portable data apparatus may further comprise a connectivity module adapted to connect terminals to the apparatus, said connectivity module comprising at least one of the following: wireless communication component, short range wireless communication component, cable tether component, USB port, PCMCIA port, firewire port, and Near Field Communication NFC component.

In accordance with a further aspect of the present invention, there is provided a method for operating at least a first terminal and a second terminal in a wireless communication network, the method comprising: determining a RAT, where at least one of the terminals is camped, operating the first terminal in a first cell and setting said first terminal operative for establishing a first data connection when said first terminal is determined to be camped in a first network type, and operating the second terminal in a second cell and setting said second terminal as operative for establishing a second data connection when said second terminal is determined to be camped in a second network type. In certain embodiments, the first cell may belong to a different Radio Access Technology (RAT) than the second cell. In other embodiments, the first cell may belong to the same Radio Access Technology (RAT) than the second cell. The Radio Access Technology (RAT) of both the first and second cell may be a 2G network and at least one of the terminals may be set to search for another Radio Access Technology (RAT). The another Radio Access Technology (RAT) may be selected from the group consisting of: 3G and LTE.

In certain embodiments, the Radio Access Technology (RAT) of both the first and second cell may be a 3G network and at least one of the terminals may be set to search for a another Radio Access Technology (RAT). In this embodiment, the another Radio Access Technology (RAT) may be an LTE network. The Radio Access Technology (RAT) of both the first and second cell may be a 3G network, LTE network not being available. The method may then comprise: establishing a 3G data connection by means of the first terminal, camped on the first network type, and determining the different available frequency bands in 3G by means of the second terminal looking at neighbouring cells, and camping the second terminal in an available free 3G frequency band according to frequency band priority defined by the operator. The method may further comprise switching at least the second terminal, camped in the Radio Access Technology (RAT) of the second cell, to 2G cell establishing a PDP context when no free available frequency is found.

In certain embodiments the first cell belongs to a Radio Access Technology (RAT) that is a LTE network the method may comprise: establishing a LTE data connection by means of the first terminal, camped on the Radio Access Technology (RAT) of the first cell, determining the different available frequency bands in LTE by means of the second terminal looking at neighbouring cells, and camping the second terminal in an available free LTE frequency band.

In some embodiments the method may comprise selecting the terminal with best coverage level as the first terminal to establish the first connection with the first network type, when the Radio Access Technology (RAT) of both first and second cell are the same. Additionally, the method may comprise selecting the terminal with higher priority Radio Access Technology (RAT) as a first terminal to establish the first connection with the first network type, when the Radio Access Technology (RAT) of the first and second cell are different. Further, the method may comprise selecting the terminal with higher TOS operator configurable access technology priority level as a first terminal to establish the first connection using the Radio Access Technology (RAT) of the the first cell, in case the network types are different.

In certain embodiments the method may comprise establishing a dual connection by means of both terminals.

In accordance with a further aspect of the invention there may be provided a portable data apparatus for managing data connections in a telecommunication network, the apparatus being in communicative connection with at least a first and a second mobile terminal, each mobile terminal being operable to establish a data connection in said telecommunication network over a plurality of types of radio access technologies; wherein the apparatus comprises a processor for determining which type of radio access technology at least one of the terminals is camped upon and for controlling connections of each one of the terminals in respective cells of respective Radio Access Technology Types RATs and for setting a given terminal as operative for establishing a data connection when said terminal is determined to be camped in a Radio Access Technology Type RAT. The apparatus may comprise mechanisms for determining the preferred Radio Access Technology Type RAT of each one of the cells covering the respective terminals. The apparatus may comprise a communication module operative to allow data connection to the cellular network, said module having access to the RNC to force single terminal connection despite coverage. The apparatus may comprise a connectivity module adapted to connect terminals to the apparatus, said connectivity module comprising at least one of the following: wireless communication component, short range wireless communication component, cable tether component, USB port, PCMCIA port, firewire port, and Near Field Communication NFC component.

BRIEF DESCRIPTION OF THE DRAWINGS

For a better understanding of the present invention, reference will now be made, by way of example only, to the accompanying drawings in which:

FIG. 2 depicts an illustration showing all the eventual embodiments of the invention.

DETAILED DESCRIPTION OF A PREFERRED EMBODIMENT

Figure 1:
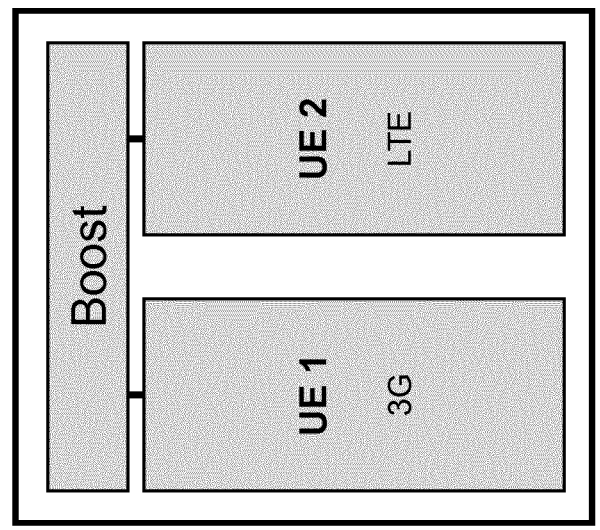
FIG. 1 depicts a diagram of the solution provided by the object of the invention.

Following the reference signs adopted in FIGS. 1 and 2, there now follows a more detailed description of an embodiment of the invention.

In a first path of the method two User Equipments [UEs] in this case two terminals, a first Terminal and a second Terminal, are camping in 2G, one Terminal only is selected and used when setting up a data connection. Terminal with highest signal RxLev (this information is available at application layer taking the RxLev measured by the terminal) whilst the other Terminal will search for 3G and LTE.

In a second path of the method the two Terminals are camping in 3G because it is the only technology available (due to there is only signal from 3G or the terminal capabilities allow to detect only the 3G coverage), one terminal only is selected and used when setting up a data connection, hence:

Terminal with highest signal CPICH/RSCP (information that is also available at application layer, since the CPICH is a channel with known power and bit sequence, this channel can be used for measurements of the signal level using the received signal code power [RSCP] that is the power measured by the terminal on a communication channel giving information regarding an indication of signal strength, a handover criterion, downlink power control, or to calculate path loss) and the other terminal will be set with a dependency:

if there is more than 1 frequency band in 3G, then the terminal will be camping in 3G. This allows to setup a 3G+3G data connection with the two terminals. To achieve this the terminal can detect if there is more than one frequency band looking at the neighbouring cells and if there is more than one frequency band, one of the terminals is forced to the band where it is not camping the other terminal, then it is possible to setup the 3G+3G connection, namely a boost connection, else, the terminal searches for 2G and LTE.

In a third path of the method the two Terminals are in LTE because it is the only technology available (due to there is only signal from LTE or the terminal capabilities allows to detect only the LTE coverage) and one terminal is only selected and used when setting up a data connection, the terminal with highest signal RSRP (available at application layer) and the other terminal will be set with a dependency: If there is more than one frequency band in LTE, then the other terminal will be camping in LTE. This allows setup a LTE+LTE data connection with the two terminals. This LTE+LTE connection, boost connection, is achieved by the terminal detecting if there is more than one frequency band looking at the neighbouring cells. If there is more than one frequency band, one of the terminals is forced to the band where it is not camping the other terminal. Else, the UE will search for 3G preferably and 2G if there is no 3G signal.

In a fourth path of the method, there is coverage from 2G and 3G but not from LTE (again due to network coverage itself or terminal capabilities limitation). Hence, one terminal is selected based on the best signal level at application level to establish a 3G data connection whilst the other terminal will be set with a dependency: If there is more than one frequency band in 3G, then the terminal will be camping in 3G, this allows setup a 3G+3G data connection with the two terminals. In order to achieve this, the terminal detects if there is more than one frequency band looking at the neighbouring cells, if there is more than one frequency band, one of the terminal is forced to the band where it is not camping the other terminal, then it is possible to setup the 3G+3G connection. Else, the terminal will camp on 2G which would allow setup a PDP context and in case the 3G coverage is lost then the data will be sent immediately through the 2G network, permitting a fast real time handover.

Moreover, the terminals will search for LTE coverage at any moment looking at the neighbouring cells. So that will change the scenario and they would behave accordingly (already explained in the corresponding scenario of this paragraph).

In a fifth path of the method there is a scenario with 2G and LTE coverage detected. Hence, an LTE Terminal is selected at application level to establish a LTE data connection, the other terminal will be set with a dependency: If there is more than one frequency band in LTE, then the terminal will be camping in LTE allowing a LTE+LTE data connection with the two terminals by means of the terminal detecting if there is more than one frequency band looking at the neighbouring cells; if there is more than one frequency band, one of the terminal is forced to the band where it is not camping the other terminal, setting up the LTE+LTE connection. Else, the terminal setup a PDP context in 2G and in case the 3G coverage is lost then the data will be sent immediately through the 2G network, allowing a fast real time handover. The terminal will also search for 3G neighbours to enhance the user performance in a better scenario.

The foregoing explanatory examples are concerned with limiting the data connection set-up to an appropriate single terminal, but then checking whether a further channel might be available so that dual terminal "boost" is possible. The following allow Boost by definition.

In a sixth path of the method there is a scenario with 3G and LTE coverage detected. Then one terminal—first terminal—is camping in a first cell belonging to a 3G Radio Access Technology RAT, and the other terminal—second terminal—is camping in a second cell belonging to a LTE Radio Access Technology RAT, that can be selected to establish a 3G+LTE data connection.

In a seventh path of the method both the terminals can be camping in all Radio Access Technologies RAT, since 3G and LTE are preferred, both the terminals can be selected to establish a 3G+LTE data connection as in the previous sixth embodiment.

In coverage conditions where a hybrid connection is possible, the call can also be refused by the controller (e.g. RNC if acting as a master) for example because one of the two systems is congested or because in current conditions the aggregation provides little benefit. In this case the controller shall select between the two terminals for the establishment of the connection either in 3G only or LTE only mode.

The method may also be used to govern the operation of the two or more terminals during calls when Reselection and/or Handover is needed on one or other Radio Access Technology RAT; in this case several possible scenarios are described.

In a first materialisation, where the 2G is the only coverage, the two terminals—User Equipments [UE]s—are camping in cells belonging to 2G Radio Access Technology RAT. One Terminal has the connection, i.e. the first terminal, whilst the other Terminal, the second terminal searches for a 3G or LTE network, and when said second terminal establishes a 3G or LTE connection, data is sent through the best connection Radio Access Technology RAT (in this case 3G, LTE).

In a second materialisation, where the two terminals have only 3G coverage, one of the terminal establish a data call in 3G.

The other terminal will be set with a dependency:
if there is more than one frequency band in 3G, then the terminal will be camping in 3G. This allows setup a 3G+3G data connection with the two terminals. Steps:
  the terminal can detect if there is more than one frequency band looking at the neighbouring cells.
  if there is more than one frequency band, one of the terminal is forced to the band where it is not camping the other terminal.
  then it is possible to setup the 3G+3G connection.
else, the terminal will search for 2G and LTE.
when one of the terminals finds a 2G network then:
  it will establish a PDP context just in case the 3G coverage is lost and then the data will be sent immediately through the 2G network. That allows a fast real time handover.
  and also it will search for LTE neighbour networks.

In a third materialisation, where the two terminals have LTE coverage, the terminal with highest signal RSRP (available at application layer) will establish a data connection.

The other terminal will be set with a dependency:
if there is more than one frequency band in LTE, then the terminal will be camping in LTE. This allows setup a LTE+LTE data connection with the two terminals. Steps are:
  the terminal can detect if there is more than one frequency band looking at the neighbouring cells.
  if there is more than one frequency band, one of the terminals is forced to the band where it is not camping the other terminal.
  then it is possible to setup the LTE+LTE connection.
else, the terminal will search for 3G preferably and 2G if there is no 3G signal. If the terminal finds a 2G network then:
  at will establish a PDP context just in case the LTE coverage is lost and then the data will be sent immediately through the 2G network. That allows a fast real time handover.
  and also it will search for 3G neighbour networks.

In a fourth materialisation, where there is coverage from 2G and 3G but not from LTE, then one terminal, let's say the first Terminal is camping in 2G and one terminal, the second Terminal is camping in 3G; then both may establish the PDP context in both RATs and, in case 3G coverage is lost, data will be sent immediately through the 2G network. That allows a fast real time handover. The terminal camped in 2G will search for LTE neighbour networks.

In a fifth materialisation, where there is a scenario with 2G and LTE coverage detected, the LTE terminal is selected at application level to establish a LTE data connection whilst the other terminal will be set with a dependency:
if there is more than 1 frequency band in LTE, then the terminal will be camping in LTE. This allows setup a LTE+LTE data connection with both terminals.
  the terminal can detect if there is more than one frequency band looking at the neighbouring cells
  if there is more than one frequency band, one of the terminal is forced to the band where it is not camping the other terminal.
  then it is possible to setup the LTE+LTE connection.
else, the terminal sets up a PDP context in 2G and, in case the 3G coverage is lost, then the data will be sent immediately through the 2G network. That allows a fast real time handover. And also it will search for 3G neighbours to enhance the user performance in a better scenario.

In an alternative materialisation, the first terminal is camping in 3G, and the second terminal is camping in LTE; if the terminal camped in 3G lose coverage then there are the possible following options:

if LTE has more than one frequency band, then the terminal will be camping in LTE. This allows to setup a LTE+LTE data connection with both terminals:
  the terminal can detect if there is more than one frequency band by looking at the neighbouring cells
  if there is more than one frequency band, the terminal not camping in LTE is then forced to the band where it is not camping the terminal camping in LTE—in another frequency.
  then it is possible to setup the LTE+LTE connection
else the Terminal will be forced to 2G, then all data will be sent through LTE and in case the LTE coverage is lost and then the data will be sent immediately through the 2G network.

If the terminal camped in LTE loses coverage then there are 2 options:
  if there is more than one frequency band in 3G, then the terminal originally camping in LTE will be moved to 3G. This allows to setup a 3G+3G data connection with both terminals by following these steps:
    The terminal can detect if there is more than one frequency band looking at the neighbouring cells.
    If there is more than one frequency band, one of the terminals is forced to the band where it is not camping the other terminal.
    Then it is possible to setup the 3G+3G connection.
  else, it will be forced to 2G, all data will then be sent through 3G and in case the 3G coverage is also lost and then the data will be sent immediately through the 2G network.

The invention claimed is:

1. A method in a portable data apparatus for managing data connections in a telecommunication network, the method comprising:
    establishing communicative connections with a plurality of mobile terminals that are each operable to establish a data connection in the telecommunication network over a plurality of types of radio access technologies (RATS);
    ascertaining which type of RAT at least one of the mobile terminals is camped upon;
    controlling connections of each one of the mobile terminals in respective cells of respective RATs; and,
    setting a given mobile terminal as operative for establishing a data connection when the given mobile terminal is determined to be camped in a particular RAT.

2. A method according to claim 1, further comprising establishing a dual connection by means of both first and second mobile terminals of the plurality of terminals.

3. A method according to claim 2, further comprising aggregating the connections to provide an enhanced data connection.

4. A method according to claim 1, wherein the portable data apparatus has access to a Radio Network Controller, RNC, of the telecommunication network, the method comprising: accessing the RNC to force terminal connection despite coverage.

5. A method according to claim 1, further comprising, when both first and second mobile terminals of the plurality of mobile terminals are determined to be camped upon a 2G cell, setting a given terminal of the first and second mobile terminals to search for a cell of another RAT.

6. A method according to claim 5, wherein the another RAT is 3G or LTE.

7. A method according to claim 1, further comprising, when both first and second mobile terminals of the plurality of mobile terminals are determined to be camped upon a 3G cell, setting at least one of the first and second mobile terminals to search for a cell of another RAT.

8. A method according to claim 7, wherein the another RAT is LTE.

9. A method according to claim 1, further comprising, when both first and second mobile terminals of the plurality of mobile terminals are determined to be camped upon a cell of the same RAT and when both of the first and second mobile terminals are determined to be camped in a particular RAT:
    setting the first mobile terminal as operative for establishing a data connection;
    determining different available frequency bands of cells of the RAT by instructing the second mobile terminal to looking at neighbouring cells; and,
    instructing the second mobile terminal to camp in a cell of the same RAT using an available frequency band different from the frequency band used by the cell in which the first mobile terminal is camped according to frequency band priority defined by the operator.

10. A method according to claim 9, wherein the RAT is 3G and wherein LTE is unavailable.

11. A method according to claim 9, further comprising switching the second mobile terminal to a 2G cell and establishing a PDP context if no available frequency band is found.

12. A method according to claim 1, further comprising, when both first and second mobile terminals of the plurality of mobile terminals are determined to be camped upon a cell of the same RAT, setting only the mobile terminal of the first and second mobile terminals having a best coverage level as operative for establishing a data connection when the mobile terminal having the best coverage level is determined to be camped in a preferred RAT.

13. A method according to claim 1, further comprising, when both first and second mobile terminals of the plurality of mobile terminals are determined to be camped upon a cell of a different RAT, setting only the mobile terminal of the first and second mobile terminals with a higher priority RAT as operative for establishing a data connection when the mobile terminal with the higher priority RAT is determined to be camped in a preferred RAT.

14. A method according to claim 1, further comprising, when both first and second mobile terminals of the plurality of mobile terminals are determined to be camped upon a cell of a different RAT, setting only the mobile terminal of the first and second mobile terminals with a higher TOS operator configurable access technology priority level as operative for establishing a data connection when the mobile terminal with the higher TOS operator configurable access technology priority level is determined to be camped in a preferred RAT.

15. A portable data apparatus for managing data connections in a telecommunication network, the apparatus comprising:
    a processor adapted to:
      establish communicative connections with a plurality of mobile terminals that are each operable to establish a data connection in the telecommunication network over a plurality of types of radio access technologies (RATs);
      ascertain which type of RAT at least one of the mobile terminals is camped upon;
      control connections of each one of the mobile terminals in respective cells of respective RATs; and set a given mobile terminal as operative for establishing a data connection when the given mobile terminal is determined to be camped in a particular RAT.

16. A portable data apparatus according to claim 15, further comprising a connectivity module adapted to connect terminals to the apparatus, said connectivity module comprising at least one of the following: wireless communication component, short range wireless communication component, cable tether component, USB port, PCMCIA port, firewire port, and Near Field Communication NFC component.

\* \* \* \* \*